United States Patent [19]

Bridges

[11] Patent Number: 4,803,557
[45] Date of Patent: Feb. 7, 1989

[54] ADJUSTABLE MOUNT FOR IMAGE SENSOR

[75] Inventor: Mark E. Bridges, Spencerport, N.Y.

[73] Assignee: Eastman Kodak Company, Rochester, N.Y.

[21] Appl. No.: 142,762

[22] Filed: Jan. 11, 1988

[51] Int. Cl.⁴ .................. H04N 5/225; H04N 3/14
[52] U.S. Cl. .................................. 358/229; 358/213.11
[58] Field of Search ............ 358/229, 213.11, 213.13, 358/225, 209, 212, 50; 250/578

[56] References Cited

U.S. PATENT DOCUMENTS

| | | | |
|---|---|---|---|
| 3,973,231 | 8/1976 | Saito et al. | 335/210 |
| 4,264,920 | 4/1981 | Sakai et al. | 358/50 |
| 4,369,470 | 1/1983 | Contant | 358/227 |
| 4,591,901 | 5/1986 | Andrevski | 358/50 |
| 4,594,613 | 6/1986 | Shinbori et al. | 358/213.11 |
| 4,639,772 | 1/1987 | Sluyter et al. | 358/229 |
| 4,642,692 | 2/1987 | Andrevski | 358/229 |
| 4,644,390 | 2/1987 | Ochi | 358/50 |
| 4,652,930 | 3/1987 | Crawford | 358/227 |
| 4,661,855 | 4/1987 | Gülck | 358/229 |

Primary Examiner—Thomas W. Brown
Assistant Examiner—Stephen Brinich
Attorney, Agent, or Firm—James A. Smith

[57] ABSTRACT

Adjustable mount for positioning an image sensor in a device for generating video signals. All movement modes are controlled by five screws which are all accessible and operable from the same direction.

13 Claims, 3 Drawing Sheets

ADJUSTABLE MOUNT FOR IMAGE SENSOR

BACKGROUND OF THE INVENTION

1. Field of the Invention

In the manufacture of apparatus including image sensors for generating video signals, such as television cameras, highly exact final positioning of the image sensor on the optical axis is required in order for the best image to be produced. The sensor must be centralized with regard to the optical axis of the lens of the apparatus, must be perpendicular to the optical axis, and it must be rotationally positioned such that the resulting picture is upright and not titled sideways. Highly refined manufacturing of the mounting parts is often not sufficient and it's usually necessary for final positioning to be done by hand by a skilled operator.

The prior art adjusting mechanisms usually do not provide for adjustment in all of the modes mentioned above. Those that provide for a variety of adjustments require that the adjusting devices be approached from different angles, requiring in some cases that the apparatus be rotated or that the operator or operators work from several directions to accomplish the adjustments.

2. Description Relative to the Prior Art

Prior art patents disclose various types of adjustment means. These include the following U.S. Pat. Nos. 3,973,231, issued Aug. 3, 1976; U.S. Pat. No. 4,264,920, issued Apr. 28, 1981; No. 4,369,470, issued Jan. 18, 1983; No. 4,591,901, issued May 27, 1986; No. 4,642,692, issued Feb. 10, 1987; No. 4,644,390, issued Feb. 17, 1987; and No. 4,652,930, issued Mar. 24, 1987. However, none of these patents teach an adjustable mount which provides the degrees of adjustment achievable with the present invention, or which, if providing several degrees of adjustment, do so in a manner which provides the simple, one directional approach described above.

SUMMARY OF THE INVENTION

An adjustable mount for positioning a device such as an image sensor along an axis is provided with means for tilting the sensor about horizontal and vertical axes, means for moving the sensor up and down, and sideways with regard to the optical axis, and means for rotating the sensor about the optical axis. The construction for accomplishing these adjustments consists of a minimum number of parts which are simple to assemble and occupy a minimum of space.

In the disclosed embodiment, the sensor is mounted in a carriage located on the optical axis and moveable only along the axis, for example, for zooming or other purposes. The sensor is mounted in the carriage by an intermediate element cooperating with the carriage by means of a single bearing structure which provides freedom of movement of the intermediate element with respect to the carriage about a horizontal axis and a vertical axis, both of which axes being perpendicular to the optical axis. The sensor is carried by the intermediate element and has several degrees of freedom with respect thereto, these being movement up and down as well as side to side, and rotational movement with regard to the intermediate element and the optical axis. All of the foregoing movements are accomplished by simple adjustment of several screws, all of which are manipulated from the same direction by a screwdriver. The axes of all of these respective screws are generally parallel, except that their adjustment may move the screws in the intermediate element slightly out of parallel with those in the carriage. Final positioning of the sensor is accomplished simply and without approaching the device from a plurality of directions.

BRIEF DESCRIPTION OF THE DRAWINGS

The invention will be described in connection with a preferred embodiment as shown in the appended drawings, in which.

DETAILED DESCRIPTION OF THE DRAWINGS

Figure 1:
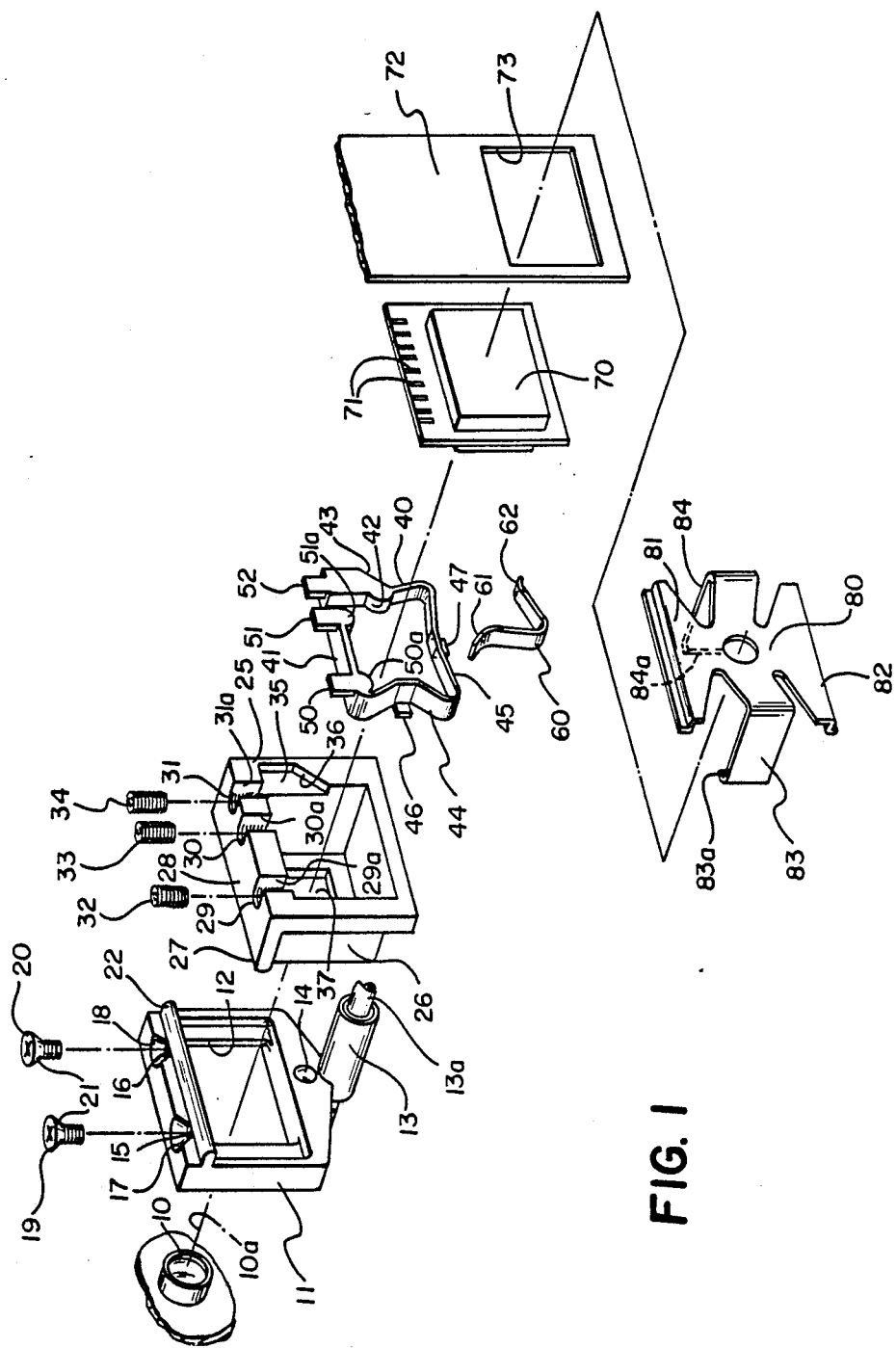
FIG. 1 is an exploded perspective view showing the elements of the mount along with the sensor and a flexible circuit for connecting the sensor to electronic parts.

Referring now to FIG. 1, there is shown a lens 10 having an optical axis 10a. As described in more detail below, the lens 10 focuses scene light upon a sensor which then generates electrical signals for transmittal to suitable electronic elements (not shown).

Figure 2:
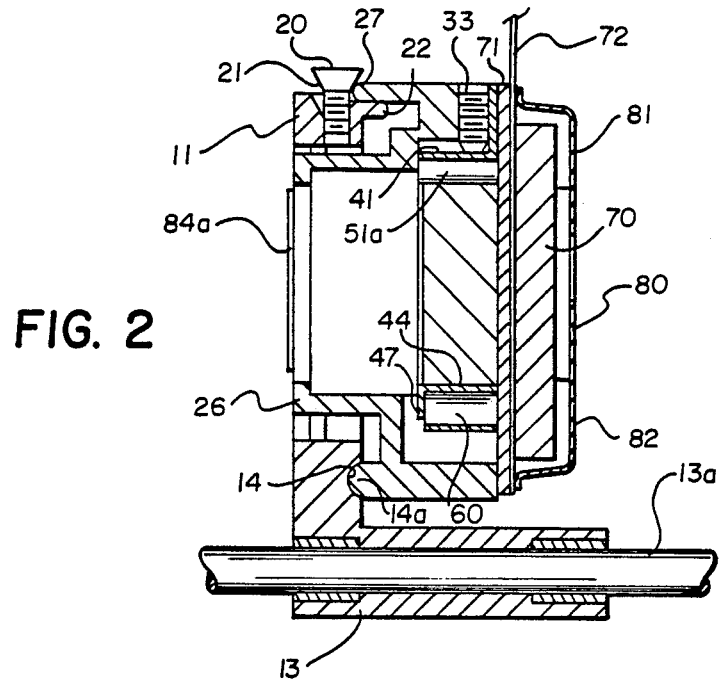
FIG. 2 is a vertical sectional view of the assembled unit.
Figure 3:
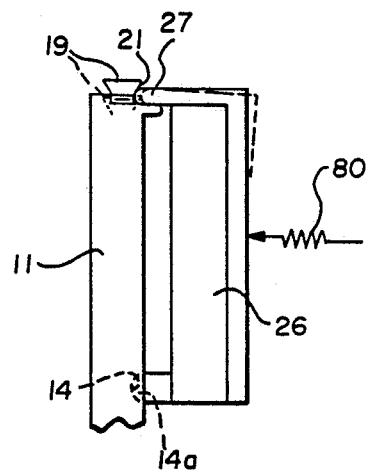
FIG. 3 is a diagrammatic view, from the side of the carriage and intermediate element (heat sink) showing the cooperation of the screws in the carriage with the intermediate element, as well as the single bearing about which the intermediate element moves about a horizontal axis.
Figure 4:
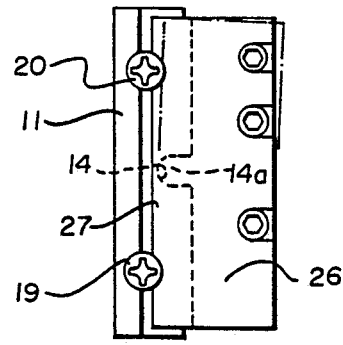
FIG. 4 is an elevational view from above, showing how the intermediate element is pivoted about the single bearing for movement about a vertical axis relative to the carriage.

A sensor carriage 11 has a central opening 12 through which the optical axis passes. The carriage is supported for movement only along the optical axis by a tubular element 13 which is attached to a zoom rod indicated at 13a. The carriage is constrained by means not shown so that it is not free to move other than with reciprocation of the rod 13a. The carriage has a spherical bearing recess 14 in its lower rear surface which is adapted to receive a mating male part 14a (FIGS. 2-4).

The upper surface of the carriage has two threaded screw holes 15 and 16 extending downwardly and countersunk at 17 and 18 respectively. Flat head screws 19 and 20 are threaded into the screw holes. The bottom surfaces 21 of their heads are tapered as is usual with flat head screws to provide surfaces complemented to the countersunk portions of the screw holes. Screw holes 15 and 16 are located on opposite sides of the center line of carriage 11 and the optical axis, and preferably are equally spaced therefrom.

A portion of the upper surface of the carriage is shaped to form a rearwardly facing ledge 22, and to leave open a rearwardly facing portion of the countersunk section of each screw hole 15, 16.

An intermediate element 26 of the carriage 11 functions as a heat sink and fits into the opening in the carriage 11 from the rear side. A rib 27 constituting an extension of the upper surface 28 of the intermediate element 26 is positioned to overlie the ledge 22 on the carriage and to abut against the tapered head portions 21 of screws 19 and 20. The spherical male bearing part 14a (FIG. 2) is located on the lower front surface of the intermediate element to mate with spherical recess 14 in the carriage and thereby form a bearing and pivot about which the intermediate element 26 can move about both vertical and horizontal axes relative to the carriage 11 (see FIGS. 3 and 4).

The intermediate element 26 also has a central opening 37 on the optical axis. Three threaded screw holes 29, 30 and 31 (FIG. 1) extend from the upper surface 28 of the intermediate element 26 into communication with the central opening in the element. Screws 32, 33 and 34 are threaded into these holes and are of sufficient length to penetrate into the interior opening in the element. Below screw hole 31, which is located near one lateral edge of the element 26, a portion of the inner wall of the element 26 has been removed at 35 to provide a downwardly sloping ramp surface 36. Rearwardly facing portions of screw holes 29, 30 and 31 are open at 29a, 30a and 31a as shown in FIG. 1 to form slots.

Screw holes 32 and 33 are located in a manner similar to screw holes 15 and 16, that is, on opposite sides of the center line and optical axis, and preferably equally spaced therefrom.

A frame like element 40 comprising an adjustment pad block is fitted within the opening in the intermediate element 26 so that the upper section 41 of the block lines up with screw holes 29 and 30 in the intermediate element 26. An enlarged portion 42 of block 40 is located below screw hole 31, and has a lower ramp surface 43 which slideably cooperates with ramp 36 in the intermediate element 26. Block 40 has a discontinuity between its upper section 41 and enlarged portion 42, permitting the two portions to move independently. Adjustment pad block 40 has four sections, an upper section 41 referred to above, a side section which carries the enlarged portion 42, a side section 44, and a bottom section 45. Sections 44 and 45 are resilient and are bowed inwardly. The section of the pad 40 which supports enlarged portion 42 is also resilient. Sections 44 and 45 have positioning tabs 46 and 47, respectively, for a purpose to be described.

Upper section 41 of the pad has upwardly extending tabs 50 and 51 dimensioned to be received within slots 29a and 30a of screw holes 29 and 30. Below each tab are centrally extending bulges 50a and 51a, respectively. A similar tab 52 extends above enlarged portion 42 to be received by slot 31a. The tabs 50, 51 and 52 serve to establish initial approximate alignment of the adjustment pad block during assembly. However, the tabs are received in their respective slots with sufficient clearance to permit movement of the adjustment pad block during adjustment of the sensor as herein described.

The inwardly bowed sections 44 and 45 of the adjustment pad block are biased inwardly by a sensor bias spring shown at 60 which is generally "L" shaped and has arcuate end portions 61 and 62 for sliding contact with the central areas of sections 44 and 45. Tabs 46 and 47 on these sections maintain the spring in position. It will be seen that spring 60 fits about the lower left corner of pad 40.

The sensor is indicated at 70, with its connectors 71 extending outwardly from the body of the sensor and facing to the rear. The parts are dimensioned so that the sensor fits closely within adjustment pad block 40, with the lateral edges of the sensor in contact with the bulges 50a and 51a along its upper edge, with the enlarged portion 42 of the pad along a side edge, with the inwardly urged, bowed section 44 of the block along the opposite side edge, and with the inwardly urged, bowed lower section 45 of the block along the sensor's bottom edge.

A flexible circuit for connecting the sensor to suitable electronics is shown at 72, with an opening 73 that fits about the sensor so that contacts on the front side of the flexible circuit (not shown) contact matching contacts 71 on the rear facing portion of the sensor.

The entire assembly is clamped together by a sensor stack retainer 80 which has relatively stiff upper and lower sections 81 and 82 which bear against the flexible circuit 72. Side sections 83 and 84 are resilient and extend forwardly far enough so that inwardly bent end portions clamp around the front of the side of carriage 11 and thereby resiliently hold the entire assembly together. The resilience is such as to permit the pivoting movement shown in FIGS. 3 and 4.

A birefringant filter 90 is shown in intermediate element 26 in front of the sensor. This filter changes the light reaching the sensor and forms no part of this invention.

OPERATION

It is believed that the foregoing description of the structure is such as to make clear the operation of the mount. FIGS. 3-6 have been included to further understanding of the operation. Referring first to FIGS. 3 and 4, the cooperation of carriage 11 and intermediate element 26 is shown in simplified form. FIG. 3 shows the bearing recess 14 and the mating part 14a of the intermediate element. The solid line and broken line positions of screw 19 and intermediate element 26 and the latter's rib 27 show the manner in which operation of both screws 19 and 20 cause tilting of the intermediate element about a horizontal axis. If both screws are in the same position, depthwise, there is no tilting about a vertical axis. However, if the screws are turned so that they enter their respective screw holes by unequal amounts, the result seen in FIG. 4 will be achieved, namely, tilting of the intermediate element about a vertical axis. The axis in each case passes through bearing 14, 14a.

Figure 5:
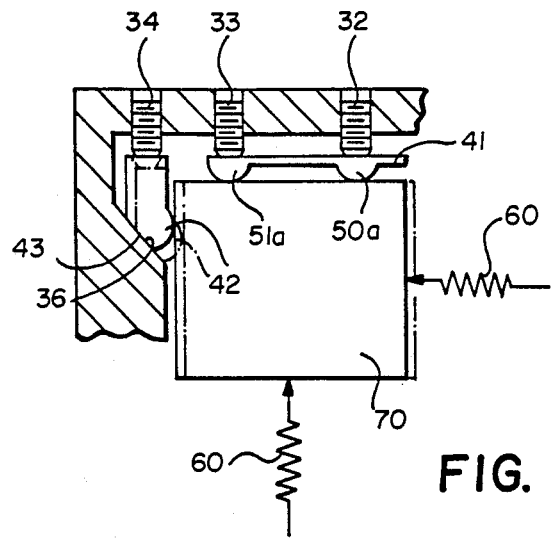
FIG. 5 is an elevational view, partly in section, showing how the screws in the intermediate element move the sensor up and down and sideways.
Figure 6:
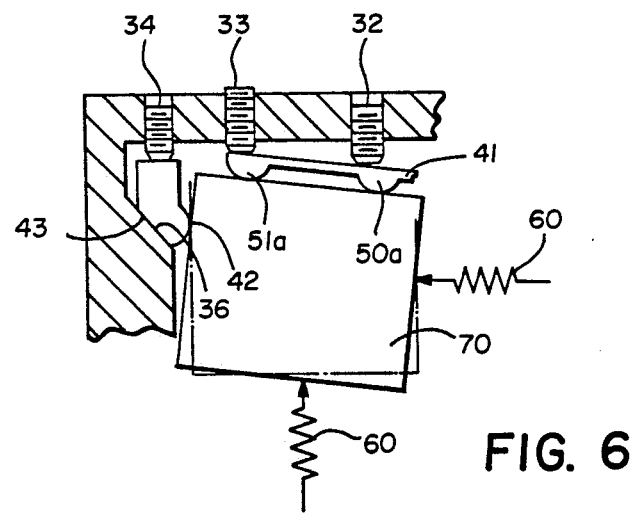
FIG. 6 is a view similar to FIG. 5 but showing how the screws in the intermediate element cause rotation of the sensor about the optical axis.

FIGS. 5 and 6 show in simplified form how the sensor is moved up and down, sideways, and rotationally about the optical axis. In FIG. 5, the solid line position of sensor 70 equates with the positions in which screws 32, 33 and 34 are shown and the positions of their related parts 41, 50a, 51a and 42. To move the sensor downwardly against the bias of spring 60, screws 32 and 33 are driven farther into their respective screw holes, causing section 41 of the adjustment pad block 40 and bulges 50a and 51a to move downwardly. If the screws enter their respective holes more deeply by equal amounts, the sensor is merely moved downwardly and is not rotated. If they are unscrewed by equal amounts, bias spring 60 moves the sensor upwardly. If they enter their respective holes by unequal amounts as shown in FIG. 6, the sensor will move to the solid line position shown in FIG. 6. This operation can of course be used to rotate the sensor either clockwise to the solid line position or counterclockwise to the broken line position.

Referring again to FIG. 5, it will be seen that driving the screw 34 deeper into its screw hole will force the enlarged portion 42 downwardly and because of the interaction of ramp surfaces 43 and 36, portion 42 will move to the right as seen in FIG. 5 and the sensor will be moved in the same direction against the bias of sensor bias spring 60. Conversely, as screw 34 is turned to move it upwardly, the bias of sensor bias spring 60 will move the sensor to the left as ramp 43 is permitted to slide up ramp 36 until the upper end of portion 42 can move no farther because on engagement with the lower end of screw 34.

FIG. 6, as alluded to above, shows the effect of turning screws 32 and 33 into their respective holes by unequal amounts.

It will be understood that FIGS. 3-6 show exaggerated movement of the parts for purposes of clarity. In actual use, the adjustments are very fine ones and are accomplished with greater precision.

The invention has been described with reference to a preferred embodiment thereof. It will be understood that variations can be effected within the spirit and scope of the invention as defined in the appended claims.

What is claimed is:

1. An adjustable mount for positioning an image sensor along the optical axis of a device for generating image signals, said mount comprising:
   a sensor carriage moveable only in a direction parallel to the optical axis,
   means for mounting the sensor in the carriage for tilting movement about horizontal and vertical axes, movement in two directions at right angles to each other and to the optical axis, and rotation about the optical axis, and
   a plurality of adjusting screws, all of whose axes are generally parallel to each other and are accessible from the same direction, for controlling said movements.

2. An adjustable mount as set forth in claim 1, wherein said mount has a single bearing between sensor and carriage providing mobility of the sensor about horizontal and vertical axes.

3. An adjustable mount as set forth in claim 1, wherein said tilting movement of the sensor is controlled by one pair of said screws.

4. an adjustable mount as set forth in claim 3, wherein movement of the sensor in a vertical direction with respect to the optical axis and sensor rotation about the optical axis is controlled by a second pair of screws.

5. An adjustable mount as set forth in claim 4, wherein movement of the sensor in a horizontal direction with respect to the optical axis is controlled by a fifth screw.

6. An adjustable mount for positioning an image sensor along the optical axis of a device for generating image signals, said mount comprising:
   a sensor carriage having a central opening on the optical axis and moveable only in a direction parallel to the optical axis,
   an intermediate element having a central opening for receiving the sensor and being located in the opening in the sensor carriage,
   a single bearing between the carriage and the intermediate element providing for movement of the intermediate element about horizontal and vertical axes,
   screw means for controlling said movement of the intermediate element, and
   other screw means for moving the sensor with regard to the intermediate element in horizontal and vertical directions as well as rotationally about the optical axis.

7. An adjustable mount as set forth in claim 6, wherein
   said single bearing comprises a spherical bearing recess in a lower surface of the sensor carriage facing the intermediate element and a mating male part on the intermediate element,
   said recess and mating part being vertically below the optical axis, and
   means biasing the intermediate element against the carriage.

8. An adjustable mount for positioning an image sensor along the optical axis of a device for generating video signals, said mount comprising:
   a sensor carriage moveable only along the optical axis,
   an intermediate element carried by the carriage,
   means providing movement of the intermediate element relative to the carriage about horizontal and vertical axes,
   means mounting the sensor on the intermediate element for movement relative thereto in horizontal and vertical directions, and
   means for causing said movements.

9. An adjustable mount as set forth in claim 8, wherein said last mentioned mounting means provides for rotational movement of the sensor relative to the intermediate element and the optical axis.

10. An adjustable mount as set forth in claim 9, said means for causing said movements comprising a plurality of screws, all of whose axes are generally parallel to each other and all of which screws are accessible from the same direction for adjustment.

11. An adjustable mount for positioning an image sensor along the optical axis of a device for generating video signals, said mount comprising:
   a sensor carriage moveable along the optical axis, said carriage having a central opening on the optical axis, a centrally located spherical bearing recess in a lower surface thereof, and two threaded and countersunk screw holes extending downwardly from the upper surface of the carriage, one of said screw holes being on each side of and spaced from the optical axis, a portion of the countersunk section of each screw hole being open and facing in the same direction as said recess,
   a flat head screw with a tapered head section in each screw hole,
   an intermediate element mounted in said central opening of the carriage and having a male part complementary to and engaging said recess, said element having a transversely extending rib in proximity to the open portions of the carriage screw holes,
   said intermediate element having a central opening on the optical axis, one side wall of which opening has a downwardly sloping ramp surface, said element having threaded screw holes in its upper surface extending downwardly into said central opening, a first of said screw holes being located over said ramp surface, a second of said screw holes being on one side of the optical axis and a third being on the other side of the optical axis,
   screws in the screw holes in the intermediate element,
   a resilient frame-like element for receiving the sensor, said element being located in the opening in the intermediate element and having thickened areas located below the respective second and third screw holes as well as an enlarged portion below said first screw hole, said enlarged portion having a ramp surface complementary to and engaging said ramp surface of the intermediate element, biasing means urging the frame-like element and sensor sideways toward the ramp surface of the intermediate element and upwardly, and means for clamping the mount parts and sensor together such that:
(a) the rib of the intermediate element is biased against the tapered head sections of the screws in the carriage whereby rotation of the screws causes movement of the intermediate element about horizontal and vertical axes, depending upon whether one or both screws are rotated and the degree of rotation,
(b) rotation of the screw in the first screw hole in the intermediate element causes movement of the ramp surfaced portion of the frame-like element along the ramp surface of the intermediate element resulting in sideways movement of the sensor, and
(c) rotation of said second and third screws in the intermediate element causes rotation of the sensor about the optical axis and up and down movement of the sensor, depending upon whether one or both screws are rotated and the degree of rotation.

12. An adjustable mount as set forth in claim 11, wherein said intermediate element is a heat sink.

13. An adjustable mount as set forth in claim 11 or 12, wherein the connectors of a flexible circuit are positioned between the resilient clamping means and the sensor such that said connectors are biased against the connectors of the sensor.

* * * * *